United States Patent
Groninga et al.

(10) Patent No.: US 10,589,855 B2
(45) Date of Patent: Mar. 17, 2020

(54) TILTROTOR AIRCRAFT WITH OUTBOARD FIXED ENGINES

(71) Applicant: Bell Helicopter Textron Inc., Fort Worth, TX (US)

(72) Inventors: Kirk L. Groninga, Keller, TX (US); Daniel B. Robertson, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 421 days.

(21) Appl. No.: 15/621,686

(22) Filed: Jun. 13, 2017

(65) Prior Publication Data

US 2018/0354616 A1 Dec. 13, 2018

(51) Int. Cl.
| | |
|---|---|
| B64C 29/00 | (2006.01) |
| B64D 27/26 | (2006.01) |
| B64D 29/02 | (2006.01) |
| B64D 35/08 | (2006.01) |
| B64D 33/02 | (2006.01) |
| B64D 27/02 | (2006.01) |

(52) U.S. Cl.
CPC .......... *B64C 29/0033* (2013.01); *B64D 27/02* (2013.01); *B64D 27/26* (2013.01); *B64D 29/02* (2013.01); *B64D 33/02* (2013.01); *B64D 35/08* (2013.01)

(58) Field of Classification Search
CPC .... B64C 29/0033; B64D 27/26; B64D 29/02; B64D 35/08; B64D 27/02
See application file for complete search history.

(56) References Cited

U.S. PATENT DOCUMENTS

| | | | |
|---|---|---|---|
| 4,829,850 A | 5/1989 | Soloy | |
| 8,602,347 B2 | 12/2013 | Isaac et al. | |
| 2012/0199699 A1* | 8/2012 | Isaac | B64C 29/0033 244/7 R |
| 2014/0084080 A1* | 3/2014 | Robertson | B64D 33/06 239/127.3 |
| 2015/0048213 A1* | 2/2015 | Ross | B64C 29/0033 244/7 A |
| 2015/0360774 A1* | 12/2015 | Covington | B64C 29/0033 244/7 R |
| 2017/0305568 A1* | 10/2017 | King | B64D 27/26 |

* cited by examiner

*Primary Examiner* — Rodney A Bonnette
(74) *Attorney, Agent, or Firm* — Timmer Law Group, PLLC (57) ABSTRACT

In a first aspect, there is a rotor system for a tiltrotor aircraft, the rotor system including an upper outboard engine in a fixed location on a wing member of the tiltrotor aircraft; a lower outboard engine in a fixed location on the wing member; and a prop-rotor pylon in power communication with the upper and lower outboard engines, the prop-rotor pylon being configured to selectively rotate between a vertical position and a horizontal position. In another aspect, there is provided a tiltrotor aircraft including a fuselage; a wing member; an upper outboard engine in a fixed location on the wing member; a lower outboard engine in a fixed location on the wing member; and a prop-rotor pylon in power communication with the upper and lower outboard engines, the prop-rotor pylon being configured to selectively rotate between a vertical position and a horizontal position.

20 Claims, 7 Drawing Sheets

TILTROTOR AIRCRAFT WITH OUTBOARD FIXED ENGINES

BACKGROUND

Technical Field

The present disclosure relates to a pylon configuration having multiple outboard engines for a tiltrotor aircraft.

Description of Related Art

A typical tiltrotor aircraft has wing mounted rotatable nacelles, each nacelle having an engine and rotor hub. The nacelles are selectively rotated between a helicopter mode and an airplane mode. During helicopter mode, the nacelles are rotated to an approximate vertical position so that the tiltrotor can hover similar to a conventional helicopter. During the airplane mode, the nacelles are rotated to approximately horizontal positions so that the tiltrotor aircraft can fly similar to a fixed wing aircraft. Because the engine is located in the nacelle, the engine must be configured and certified to operate not only in horizontal orientation but also in vertical orientation, thus limiting engine choices. Further, a rotating engine typically requires more maintenance than a fixed engine. Even further, a rotating engine typically requires complex engine mounting structures that can limit maintenance and inspection access around the engine.

There is a need for an improved engine and pylon configuration for a tiltrotor aircraft.

SUMMARY

In a first aspect, there is a rotor system for a tiltrotor aircraft, the rotor system including an upper outboard engine in a fixed location on a wing member of the tiltrotor aircraft; a lower outboard engine in a fixed location on the wing member; and a prop-rotor pylon in power communication with the upper and lower outboard engines, the prop-rotor pylon being configured to selectively rotate between a vertical position and a horizontal position.

In an embodiment, the upper outboard engine is disposed outboard of the prop-rotor pylon.

In one embodiment, the lower outboard engine is disposed outboard of the prop-rotor pylon.

In an exemplary embodiment, the upper outboard engine is vertically stacked above the lower outboard engine.

In yet another embodiment, the rotor system includes an outboard nacelle configured as an aerodynamic housing for the upper and lower outboard engines.

In an embodiment, the outboard nacelle further includes an air inlet system configured to direct airflow into the upper and lower outboard engines.

In still another embodiment, the air inlet system includes an upper duct defining an inlet to flow air into the upper outboard engine; and a lower duct defining an inlet to flow air into the lower outboard engine.

In an embodiment, the rotor system includes an upper outboard driveshaft coupled between the upper outboard engine and an outboard gearbox; and a lower outboard driveshaft coupled between the lower outboard engine and the outboard gearbox.

In one embodiment, the upper and lower outboard driveshafts are generally parallel.

In an exemplary embodiment, the outboard gearbox is coupled to an outboard gearbox driveshaft, wherein the prop-rotor pylon rotates about the outboard gearbox driveshaft when orienting between the vertical position and the horizontal position.

In another embodiment, the rotor system includes an interconnect driveshaft coupled to the outboard gearbox to drive a second prop-rotor pylon located on an opposite portion of the wing member.

In a second aspect, there is provided a tiltrotor aircraft including a fuselage; a wing member; an upper outboard engine in a fixed location on the wing member; a lower outboard engine in a fixed location on the wing member; and a prop-rotor pylon in power communication with the upper and lower outboard engines, the prop-rotor pylon being configured to selectively rotate between a vertical position and a horizontal position.

In an embodiment, the upper outboard engine is disposed outboard of the prop-rotor pylon.

In one embodiment, the lower outboard engine is disposed outboard of the prop-rotor pylon.

In another embodiment, the upper outboard engine is vertically stacked above the lower outboard engine.

In still another embodiment, the aircraft includes an outboard nacelle configured as an aerodynamic housing for the upper and lower outboard engines.

In an embodiment, the outboard nacelle further includes an air inlet system configured to direct airflow into the upper and lower outboard engines.

In yet another embodiment, the air inlet system further includes an upper duct defining an inlet to flow air into the upper outboard engine; and a lower duct defining an inlet to flow air into the lower outboard engine.

In an embodiment, there is an upper outboard driveshaft coupled between the upper outboard engine and an outboard gearbox; and a lower outboard driveshaft coupled between the lower outboard engine and the outboard gearbox.

In one embodiment, the upper and lower outboard driveshafts are generally parallel.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes an engine and pylon arrangement for a tiltrotor aircraft in which the engine is fixed in relation to a wing portion of the aircraft, while the pylon is rotatable. The pylon supports a rotor hub having a plurality of rotor blades. Rotation of the pylon allows the aircraft to selectively fly in a helicopter mode and an airplane mode, as well as any combination thereof.

Figure 1:
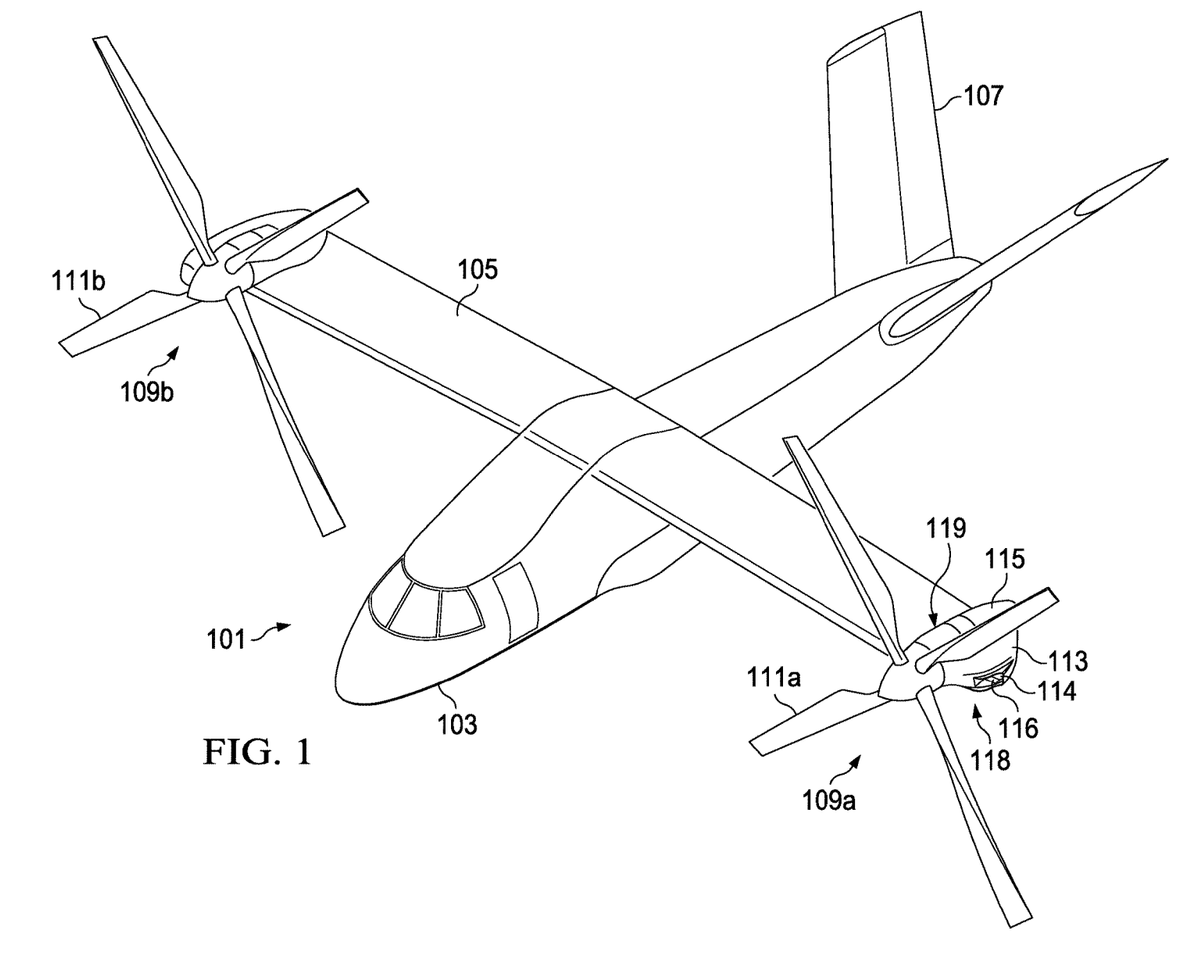
FIG. 1 is a perspective view of a tiltrotor aircraft, according to an example embodiment of the present disclosure.

Referring to FIG. 1, a tiltrotor aircraft 101 is illustrated. In the illustrated embodiment, tiltrotor aircraft 101 includes a fuselage 103, a wing member 105, and a tail member 107. Aircraft 101 further includes a first rotor system 109a and a second rotor system 109b. First rotor system 109a is located on a left end portion of wing member 105, while second rotor system 109b is located on a right end portion of wing member 105. First rotor system 109a and second rotor system 109b are substantially symmetric of each other. In the interest of clarity, only first rotor system 109a will be discussed in detail. However, one of ordinary skill in the art will understand that the form and function of second rotor system 109b will be fully known from the benefit of the disclosure herein related to first rotor system 109a. Furthermore, first rotor system 109a and second rotor system 109b each include rotor blades 111a, 111b, respectively. However, in the interest of clarity, rotor blades 111a, 111b are omitted from some drawing views.

It should be appreciated that even though first rotor system 109a and second rotor system 109b are illustrated on tiltrotor aircraft 101, first rotor system 109a and second rotor system 109b can be implemented on other tiltrotor aircraft. For example, an alternative embodiment can include a quad tiltrotor aircraft that has an additional wing member located aft of wing member 105, the additional wing member can have additional rotor systems similar to first rotor system 109a and second rotor system 109b. Another alternative embodiment can include an unmanned version of tiltrotor aircraft 101. Further, first rotor system 109a and second rotor system 109b can be integrated into a variety of tiltrotor aircraft configurations.

Figure 2:
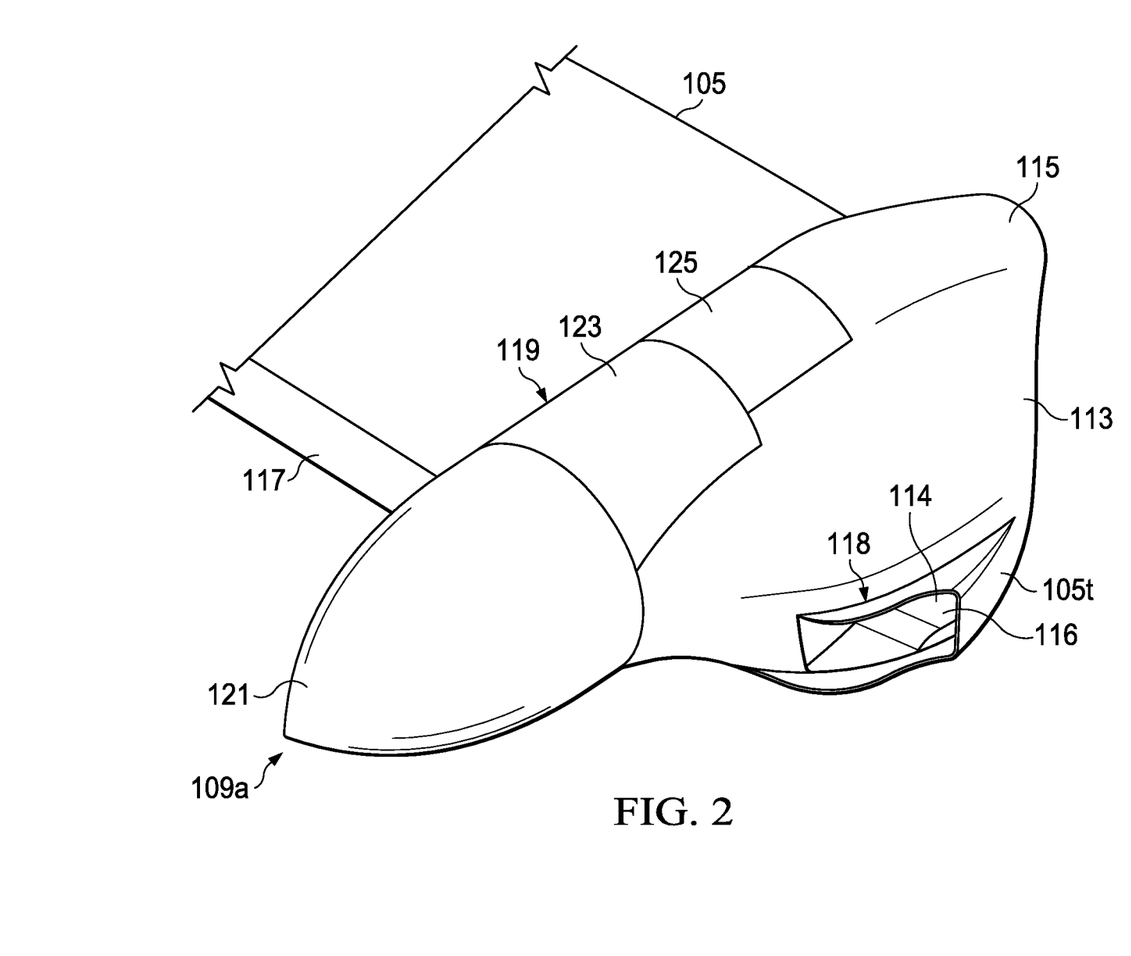
FIG. 2 is a perspective view of a rotor system in airplane mode, according to an exemplary embodiment of the present disclosure.
Figure 3:
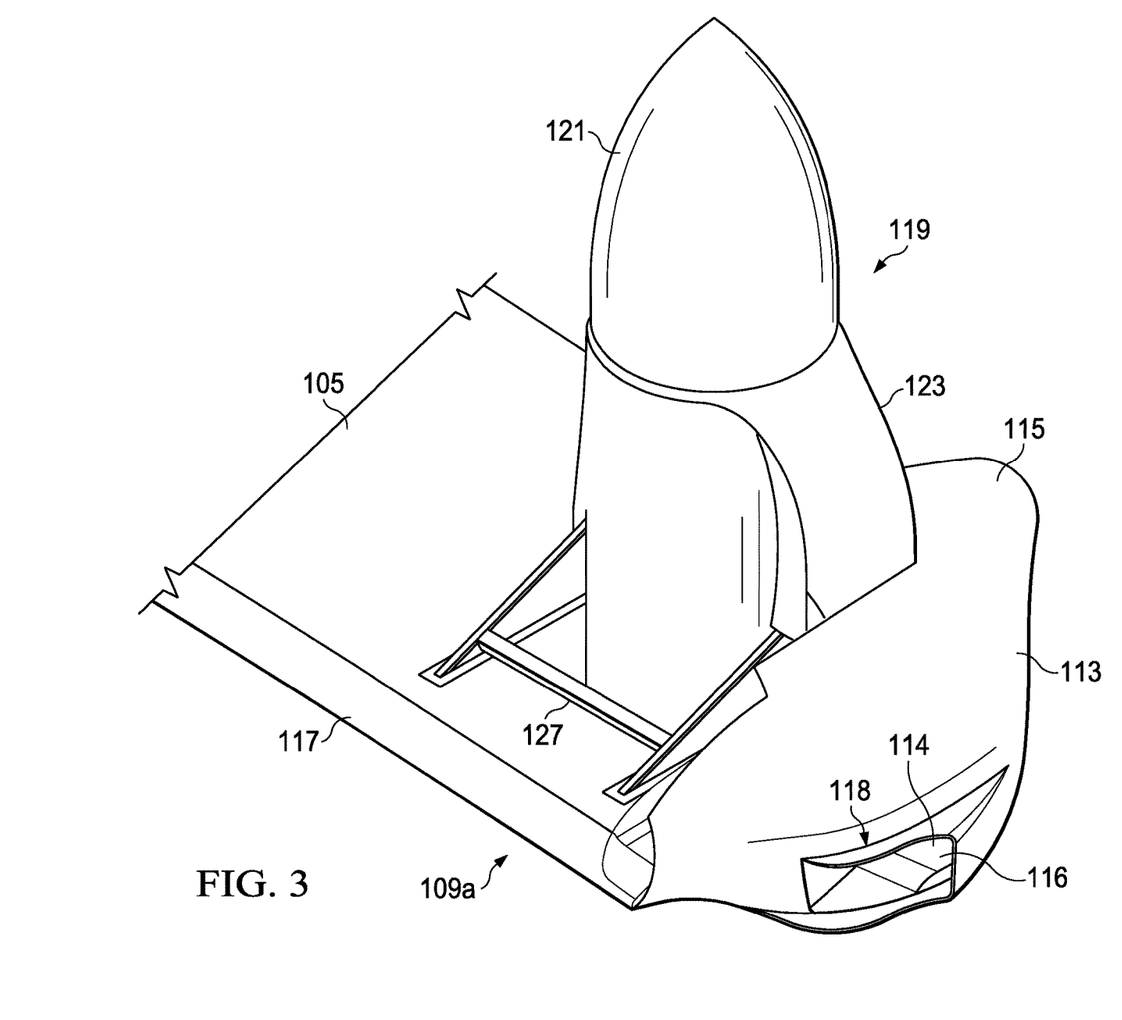
FIG. 3 is a perspective view of a rotor system in helicopter mode, according to an exemplary embodiment of the present disclosure.
Figure 4A:
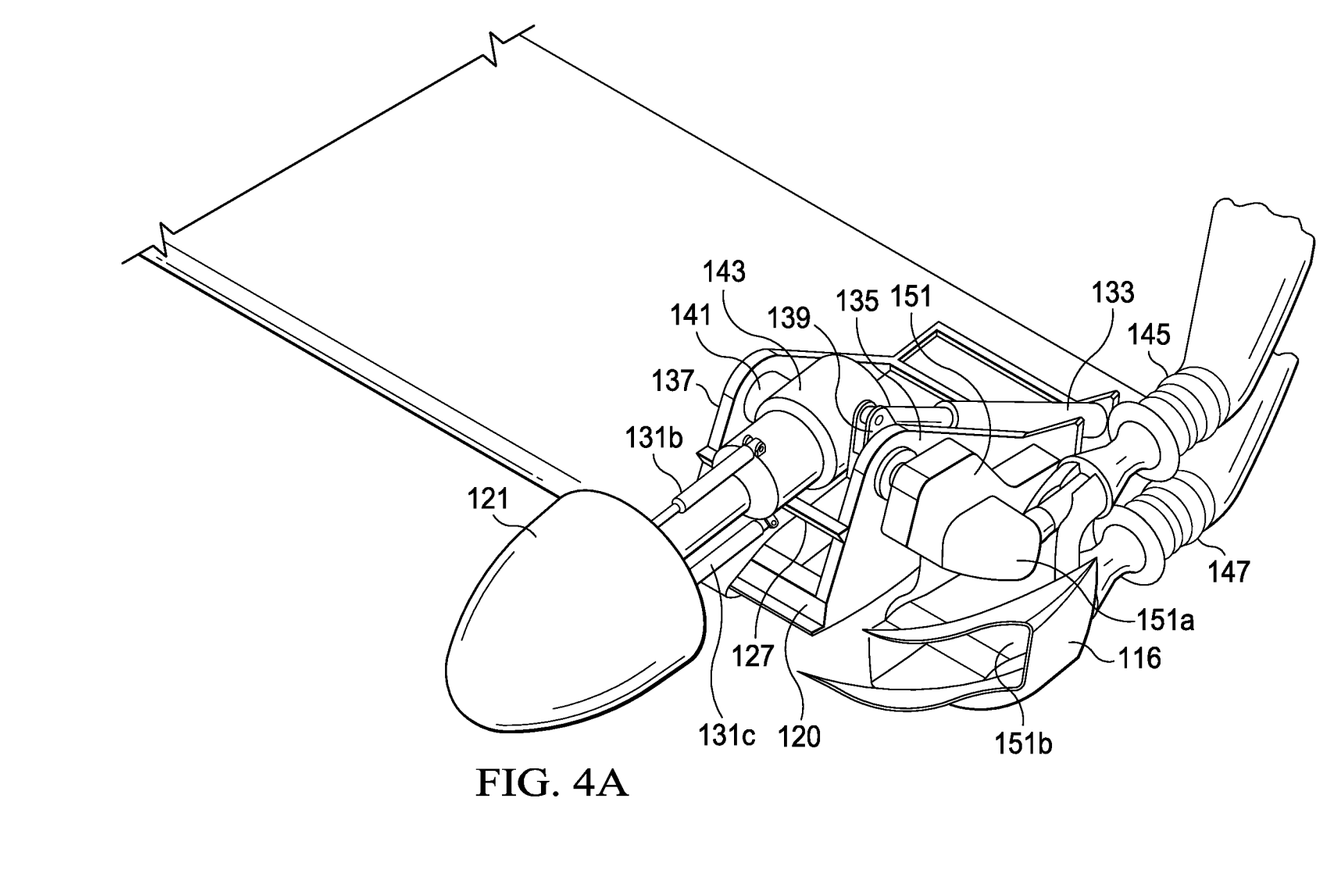
FIG. 4A is a perspective view of a rotor system in airplane mode, according to an exemplary embodiment of the present disclosure.
Figure 4B:
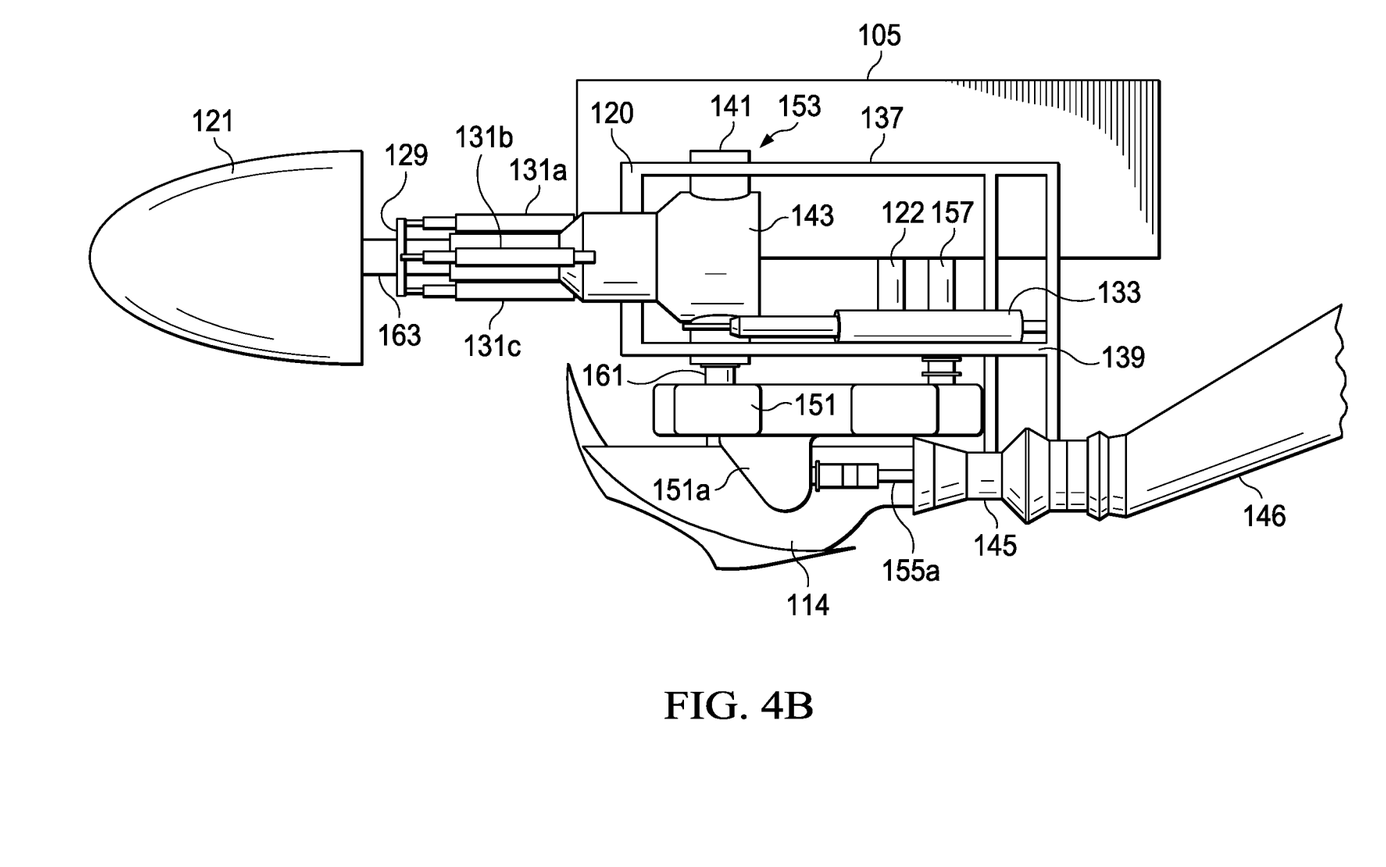
FIG. 4B is a top view of a rotor system in airplane mode, according to an exemplary embodiment of the present disclosure.
Figure 5:
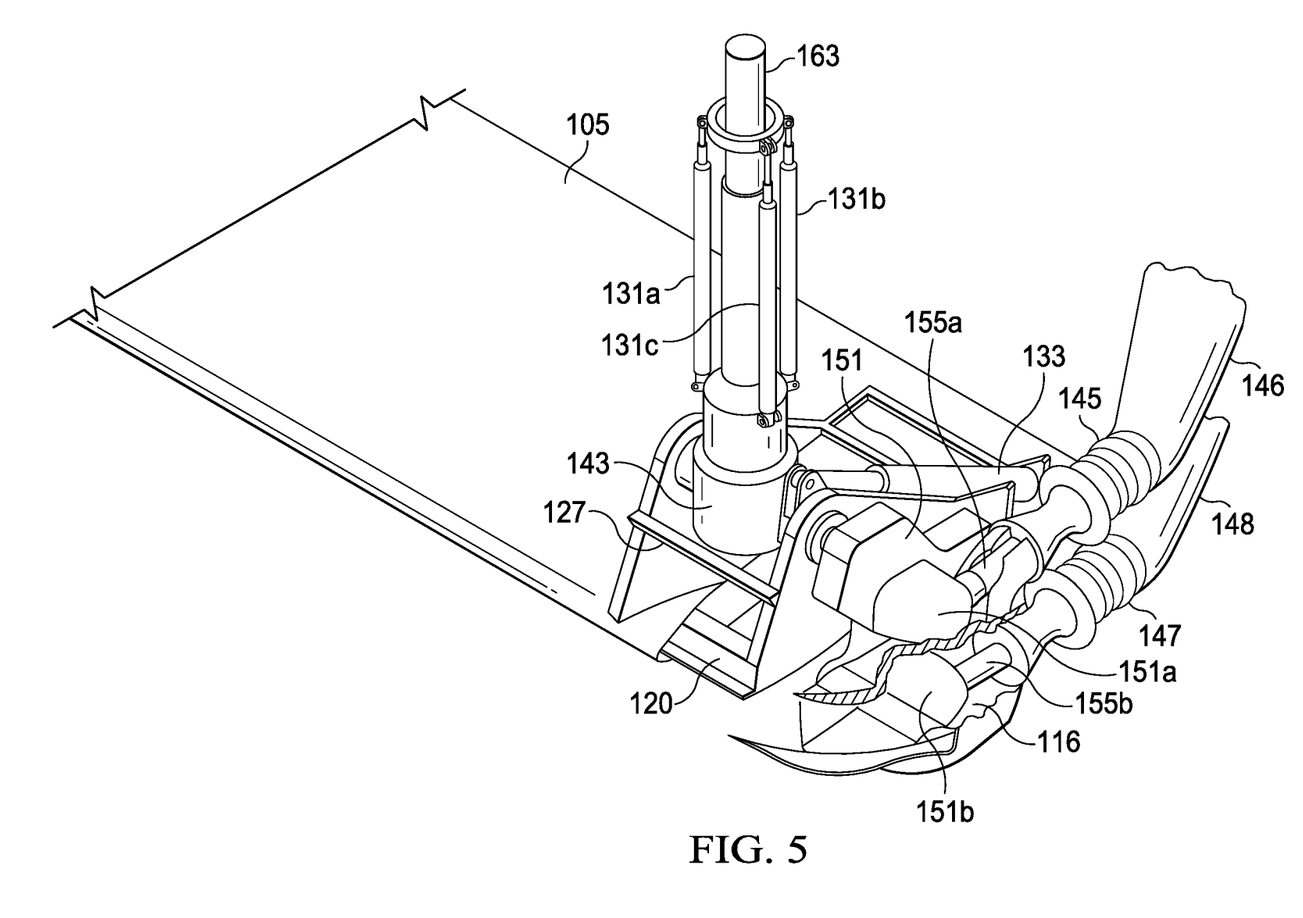
FIG. 5 is a top, front perspective view of a rotor system in helicopter mode, according to an exemplary embodiment of the present disclosure.
Figure 6:
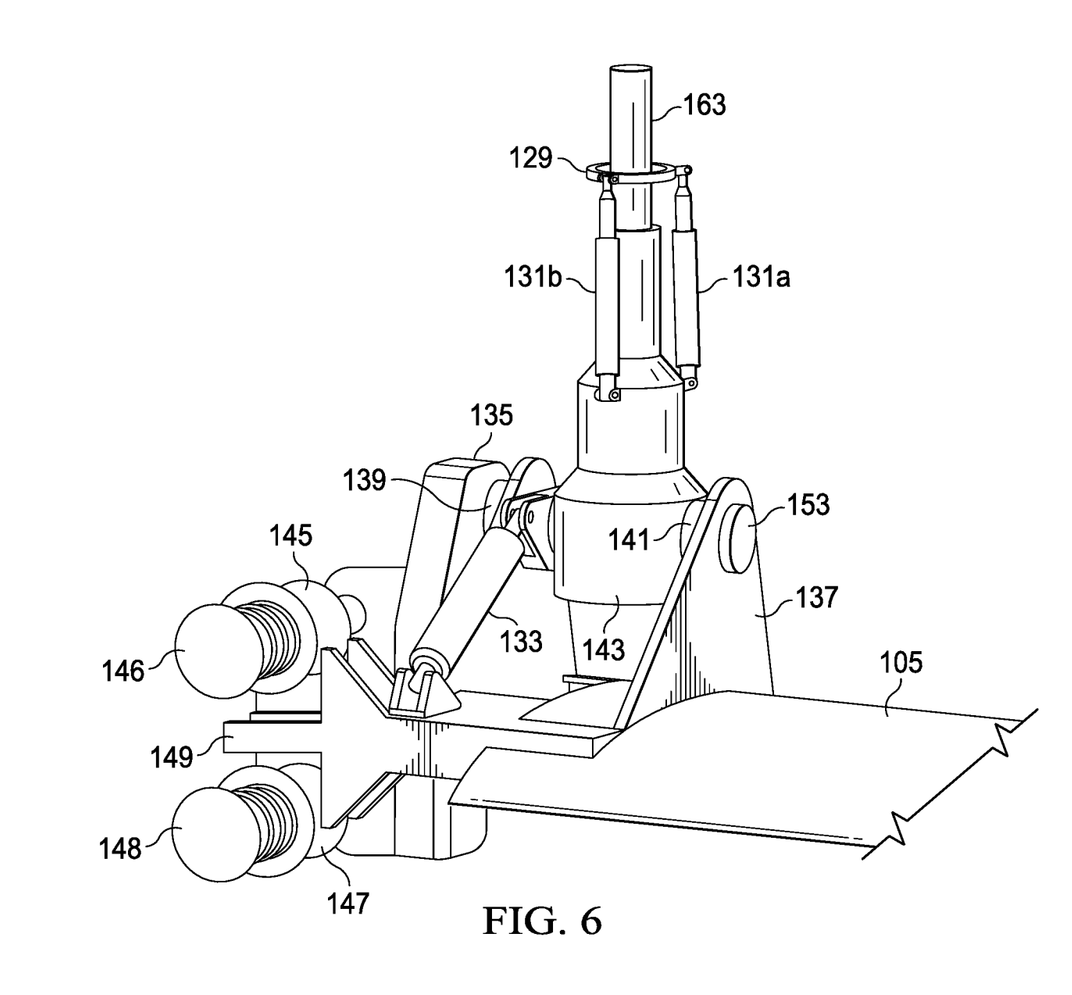
FIG. 6 is a rear perspective view of a rotor system in helicopter mode, according to an exemplary embodiment of the present disclosure.

Referring now to FIGS. 2-3, rotor system 109a is illustrated in an airplane mode and a helicopter mode, respectively. Rotor system 109a includes an outboard fixed engine nacelle 113 and an inboard fixed engine nacelle 115 both configured to provide an aerodynamic housing for internal components located therein.

A prop-rotor pylon 119 is inboard of the outboard fixed engine nacelle 113. Prop-rotor pylon 119 includes a plurality of rotor blades 111a (shown in FIG. 1) coupled to internal rotor structure located within an aerodynamic spinner fairing 121. Prop-rotor pylon 119 includes a nacelle fairing 123 that is configured to rotate along with other rotatable pylon structure. Rotor system 109a can include a moveable fairing panel 125 that can be actuated in the aft direction in order to provide rotational clearance for nacelle fairing 123 when prop-rotor pylon 119 is actuated into helicopter mode. Further, moveable fairing panel 125 is actuated forward when prop-rotor pylon 119 is actuated into airplane mode so as to improve aerodynamic airflow about the aft portion of prop-rotor pylon 119. Moveable fairing panel 125 can be actuated with an independent actuator, or can be mechanically coupled to the actuator system used for actuating prop-rotor pylon 119 between airplane mode and helicopter mode.

Prop-rotor pylon 119 is rotatable between the airplane mode, in which prop-rotor pylon 119 is positioned approximately horizontal (as shown in FIGS. 1 and 2), and a helicopter mode (as shown in FIG. 3), in which prop-rotor pylon 119 is positioned approximately vertical. During the airplane mode, vertical lift is primarily supplied by the airfoil profile of wing member 105, while rotor blades 111a, 111b in each prop-rotor pylon 119 provide forward thrust. During the helicopter mode, vertical lift is primarily supplied by the thrust of rotor blades 111a, 111b in each prop-rotor pylon 119. It should be appreciated that tiltrotor aircraft 101 may be operated such that prop-rotor pylons 119 are selectively positioned between airplane mode and helicopter mode, which can be referred to as a conversion mode.

Rotor system 109a can include a pylon downstop 127 for securing prop-rotor pylon 119 when prop-rotor pylon 119 is positioned in the airplane mode. Further, pylon downstop 127 can be beneficial for relieving stresses on the actuator(s), such as a conversion actuator 133, used for selectively rotating prop-rotor pylon 119 between airplane mode position and helicopter mode position.

Outboard fixed engine nacelle 113 includes an air inlet system 118. Air inlet system 118 is configured to direct airflow into upper and lower outboard engines 145, 147. In an embodiment, air inlet system includes an upper duct 114 and a lower duct 116 each defining an inlet to flow air into upper and lower outboard engines 145, 147, respectively. Ducts 114, 116 can be positioned aft of leading edge portion 117 of wing member 105; however, an alternative embodiment can include the positioning of ducts 114, 116 forward of or aligned with leading edge portion 117 of wing member 105. The exact position of ducts 114, 116 is implementation specific and dependent in part upon the aerodynamic ram air effects that can be achieved through selective placement.

Referring now also to FIGS. 4A-4B, and 5-7, rotor system 109a is illustrated in further detail. A swashplate 129 is coupled to rotor blades 111a via a plurality of pitch links (not shown). Swashplate actuators 131a, 131b, 131c are configured to selectively actuate swashplate 129, thereby selectively changing the pitch of rotor blades 111a so as to affect thrust, lift, and direction of aircraft 101 during operation. For example, swashplate 129 can be selectively tilted to effect cyclic pitch change of rotor blades 111a. Further, swashplate 129 can be actuated to effect collective pitch change of rotor blades 111a. A conversion actuator 133 is configured to selectively actuate prop-rotor pylon 119 between a helicopter mode position and an airplane mode position, while the engines 145 and 147 remain fixed on wing member 105. In an embodiment, conversion actuator 133 is disposed in inboard fixed engine nacelle 115. It should be appreciated that conversion actuator 133 may be of a variety of configurations. For example, conversion actuator 133 may be a linear actuator or a rotary actuator, the exact actuator type being implementation specific.

A prop-rotor gearbox housing 143 of prop-rotor pylon 119 is pivotally mounted via a rotating hinge 153 disposed on an outboard rib bearing 139 within an outboard rib 135, and an inboard rib bearing 141 within an inboard rib 137. Prop-rotor gearbox housing 143 can be disposed between the forward spar 120 and aft spar 122. Prop-rotor gearbox housing 143 can house an outboard gearbox driveshaft 161 and can rotate about the outboard gearbox driveshaft 161 when orienting between the horizontal (airplane mode) and vertical positions (helicopter mode).

Upper and lower engines 145, 147 can be structurally mounted on an engine support beam 149 near a trailing edge portion of wing member 105 (e.g., aft of the prop-rotor pylon 119). In an exemplary embodiment, upper and lower engines 145, 147 are adjacent to the wing tip portion 105t of wing member 105 and outboard of the prop-rotor pylon 119. It should be appreciated that the wing tip portion 105t of wing member 105 can be lengthened to customize an aspect ratio of wing member 105 in accordance with implementation specific aerodynamic lift requirements. As such, it should be understood that even though outboard fixed engine nacelle 113 is illustrated approximately abutting the wing tip portion 105t of wing member 105, an alternative embodiment may include the wing tip portion 105t extending well beyond outboard fixed engine nacelle 113.

In an exemplary embodiment, upper and lower engines 145, 147 are stacked generally vertically such that the upper engine 145 is disposed above the lower engine 147. In an embodiment, upper engine 145 is disposed generally above aft spar 122. In one embodiment, lower engine 147 is disposed generally below aft spar 122. In other embodiments, the upper or lower engine 145, 147 can be vertically stacked and offset such that at least one of the upper and lower engines 145, 147 is oriented further outboard than the other engine (e.g., upper engine 145 is outboard of the lower engine 147 or lower engine 147 is outboard of the upper engine 145).

Upper and lower engines 145, 147 are mechanically coupled to an outboard gearbox 151, via upper and lower outboard driveshafts 155a, 155b, such that torque is transferred to outboard gearbox 151 from upper and lower engines 145, 147, respectively. Upper and lower outboard driveshafts 155a, 155b are connected to upper and lower portions 151a, 151b, respectively, of gearbox 151. In an embodiment, upper and lower outboard driveshafts 155a, 155b are generally parallel and can be vertically stacked (e.g., upper driveshaft 155a is vertically stacked above lower driveshaft 155b). In an embodiment, upper and lower outboard driveshafts 155a, 155b are outboard of outboard rib 135. In an exemplary embodiment, outboard gearbox 151 can be a multiple engine drive system that includes multiple input driveshafts, separate gear trains for drivingly coupling each of the multiple input driveshafts (e.g., upper and lower driveshafts 155a, 155b), and an output shaft adjacent to the prop-rotor pylon 119 (e.g. outboard gearbox driveshaft 161). Torque is transferred to a main rotor mast 163 from outboard gearbox 151 via an outboard gearbox driveshaft 161.

In an embodiment, gearbox 151 includes an interconnect driveshaft 157. In some embodiments, interconnect driveshaft 157 can be used to drive an auxiliary gearbox located within fuselage 103. In an embodiment, interconnect driveshaft 157 is adjacent to aft wing spar 122. In exemplary embodiment, interconnect driveshaft 157 is configured to carry engine power between rotor systems 109a,109b. In an exemplary embodiment, interconnect driveshaft 157 can be sized to carry torque from upper and lower outboard engines 145, 147 to drive rotor blades 111b on rotor system 109b, which can provide an additional safety factor in an engine failure situation. In an embodiment, upper and lower outboard engines 145, 147 in rotor system 109a can provide about 75 percent of the total power needed in an engine failure situation (e.g., engines failed in rotor system 109b), which advantageously provides improved power over conventional tiltrotor aircraft with a single engine in each nacelle.

Rotor system 109a can including upper and lower exhaust systems 146, 148 disposed in outboard fixed engine nacelle 113. Upper and lower engines 145, 147 are configured to selectively feed hot air to upper and lower exhaust systems 146, 148 during operation.

The configuration of rotor system 109a allows upper and lower engines 145, 147 to remain fixed on wing member 105, while only prop-rotor pylon 119 rotates to allow aircraft 101 to fly both in a helicopter mode, an airplane mode, and conversion mode. Attempts have been made in prior tiltrotor aircraft configurations to locate fixed engines within a fuselage of the aircraft; however, such a configuration requires an interconnect drive system to carry full engine power out to the wing tip mounted rotor and prop-rotor drive gearboxes, which can degrade safety and reliability of the drive system. In contrast, rotor system 109a is configured such that the upper and lower engines 145, 147 are located outboard of and adjacent to prop-rotor pylon 119, so that only a short input shaft system is required to carry full engine power. As such, the short input driveshaft system from each engine to the proprotor pylon provides increased safety, reliability, and efficiency. In the illustrated embodiment, full engine power is carried in upper and lower driveshafts 155a, 155b, as well as gearbox driveshaft 161, and optionally in interconnect driveshaft 157.

The illustrative embodiments of the tiltrotor aircraft described herein can advantageously provide at least one of the following advantages: the aircraft can be operated at gross weights higher than conventional tiltrotor aircraft; in an engine inoperative situation the aircraft would have more total power available as compared to a conventional aircraft (e.g., in an embodiment, the aircraft described herein could have about 75% of the total power available in an engine inoperative situation, as opposed to a conventional aircraft, which would have about 50% of the total power in an engine inoperative situation); the aircraft has improved ease of maintenance and inspection by permitting inspection of both engines at one outboard location; rotor system 109a with fixed engines does not requiring an additional transmission case; configuring rotor system 109a with fixed engines, instead of engines that rotate, results in a significant reduction in engine certification costs, complexity, and expense; and a rotor system 109a with fixed engines, instead of engines that rotate, can provide a substantial increase in engine options and availabilities, thus contributing to aircraft cost reduction.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, Rl, and an upper, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

The invention claimed is:

1. A rotor system for a tiltrotor aircraft, the rotor system comprising:
    an upper outboard engine in a fixed location on a wing member of the tiltrotor aircraft;
    a lower outboard engine in a fixed location on the wing member; and
    a prop-rotor pylon in power communication with the upper and lower outboard engines, the prop-rotor pylon being configured to selectively rotate between a vertical position and a horizontal position.

2. The rotor system according to claim 1, wherein the upper outboard engine is disposed outboard of the prop-rotor pylon.

3. The rotor system according to claim 1, wherein the lower outboard engine is disposed outboard of the prop-rotor pylon.

4. The rotor system according to claim 1, wherein the upper outboard engine is vertically stacked above the lower outboard engine.

5. The rotor system according to claim 1, further comprising:
    an outboard nacelle configured as an aerodynamic housing for the upper and lower outboard engines.

6. The rotor system according to claim 5, wherein the outboard nacelle further comprises an air inlet system configured to direct airflow into the upper and lower outboard engines.

7. The rotor system according to claim 6, wherein the air inlet system further comprising:
    an upper duct defining an inlet to flow air into the upper outboard engine; and
    a lower duct defining an inlet to flow air into the lower outboard engine.

8. The rotor system according to claim 1, further comprising:
    an upper outboard driveshaft coupled between the upper outboard engine and an outboard gearbox; and
    a lower outboard driveshaft coupled between the lower outboard engine and the outboard gearbox.

9. The rotor system according to claim 8, wherein the upper and lower outboard driveshafts are parallel.

10. The rotor system according to claim 8, wherein the outboard gearbox is coupled to an outboard gearbox driveshaft;
    wherein the prop-rotor pylon rotates about the outboard gearbox driveshaft when orienting between the vertical position and the horizontal position.

11. The rotor system according to claim 10, further comprising:
    an interconnect driveshaft coupled to the outboard gearbox to drive a second prop-rotor pylon located on an opposite portion of the wing member.

12. A tiltrotor aircraft comprising:
    a fuselage;
    a wing member;
    an upper outboard engine in a fixed location on the wing member;
    a lower outboard engine in a fixed location on the wing member; and
    a prop-rotor pylon in power communication with the upper and lower outboard engines, the prop-rotor pylon being configured to selectively rotate between a vertical position and a horizontal position.

13. The tiltrotor aircraft according to claim 12, wherein the upper outboard engine is disposed outboard of the prop-rotor pylon.

14. The tiltrotor aircraft according to claim 12, wherein the lower outboard engine is disposed outboard of the prop-rotor pylon.

15. The tiltrotor aircraft according to claim 12, wherein the upper outboard engine is vertically stacked above the lower outboard engine.

16. The tiltrotor aircraft according to claim 12, further comprising:
    an outboard nacelle configured as an aerodynamic housing for the upper and lower outboard engines.

17. The tiltrotor aircraft according to claim 16, wherein the outboard nacelle further comprises an air inlet system configured to direct airflow into the upper and lower outboard engines.

18. The tiltrotor aircraft according to claim 17, wherein the air inlet system further comprising:
- an upper duct defining an inlet to flow air into the upper outboard engine; and
- a lower duct defining an inlet to flow air into the lower outboard engine.

19. The tiltrotor aircraft according to claim 12, further comprising:
- an upper outboard driveshaft coupled between the upper outboard engine and an outboard gearbox; and
- a lower outboard driveshaft coupled between the lower outboard engine and the outboard gearbox.

20. The tiltrotor aircraft according to claim 19, wherein the upper and lower outboard driveshafts are parallel.

* * * * *